United States Patent
Stucker

(10) Patent No.: US 8,873,694 B2
(45) Date of Patent: Oct. 28, 2014

(54) PRIMARY NEUTRON SOURCE MULTIPLIER ASSEMBLY

(75) Inventor: David L. Stucker, Irmo, SC (US)

(73) Assignee: Westinghouse Electric Company LLC, Cranberry Township, PA (US)

( * ) Notice: Subject to any disclaimer, the term of this patent is extended or adjusted under 35 U.S.C. 154(b) by 1000 days.

(21) Appl. No.: 12/899,596

(22) Filed: Oct. 7, 2010

(65) Prior Publication Data
US 2012/0087454 A1    Apr. 12, 2012

(51) Int. Cl.
*G21G 4/02*     (2006.01)
*G21C 3/326*    (2006.01)
*G21C 17/10*    (2006.01)

(52) U.S. Cl.
CPC *G21G 4/02* (2013.01); *G21C 3/326* (2013.01); *G21C 17/10* (2013.01); *Y02E 30/38* (2013.01)
USPC .......................................................... 376/191

(58) Field of Classification Search
None
See application file for complete search history.

(56) References Cited

U.S. PATENT DOCUMENTS

| | | | |
|---|---|---|---|
| 2,879,216 A | | 3/1959 | Hurwitz, Jr. et al. |
| 3,269,915 A | | 8/1966 | Ransohoff et al. |
| 3,396,077 A | | 8/1968 | Bodnarescu |
| 3,800,150 A | * | 3/1974 | Givens ..................... 376/190 |
| 4,208,247 A | * | 6/1980 | Impink, Jr. .............. 376/191 |
| 4,588,547 A | | 5/1986 | Impink, Jr. et al. |
| 4,820,478 A | * | 4/1989 | Freeman .................. 376/333 |
| 4,961,767 A | | 10/1990 | Schermerhorn et al. |
| 5,400,375 A | | 3/1995 | Suzuki et al. |
| 6,577,697 B2 | * | 6/2003 | Pearcy et al. ............. 376/159 |
| 2005/0082469 A1 | | 4/2005 | Carlo |

FOREIGN PATENT DOCUMENTS

WO    WO2009135163    11/2009

OTHER PUBLICATIONS

Zhezherun, F. et al., Fission Neutron Breeding in Beryllium, Dec. 1963, ATomnaya Energiya, vol. 15, No. 6, p. 485-489 (Translation of).*
Martin, R.C., The U.S. Department of Energy Californium-252 Program, Jan. 2000, p. 2.*
Zhezherun, F. et al., Fission Neutron Breeding in Bryllium, Dec. 1963, Atomnaya Energiya, vol. 15, No. 6, p. 485-489 (Translation of).*
Wikipedia, "Startup neutron source," http://en.wikipedia.org/wiki/Neutron_startup_source, 3 pages, Jul. 7, 2010.
Wikipedia, "Neutron source," http://en.wikipedia.org/wiki/Neutron_source, 3 pages, Jul. 7, 2010.
Wikipedia, "Beryllium," http://en.wikipedia.org/wiki/BHeryllium, 8 pages, Jul. 7, 2010.
Webelements Periodic Table of the Elements, "Californium: uses," http://www.webelements.com/californium/uses.html, 4 pages, Jul. 7, 2010.
PCT International Search Report, PCT/US2011/053196, Jan. 23, 2012, 3 pages.

* cited by examiner

*Primary Examiner* — Jack W Keith
*Assistant Examiner* — Kimberly E Coghill
(74) *Attorney, Agent, or Firm* — Joseph C. Spadacene; Westinghouse Electric Company LLC

(57) ABSTRACT

A neutron emitting assembly, which is useful in nuclear reactors and other industrial applications, is made of a major amount of beryllium encapsulating a minor amount of $^{252}$Cf, which can be placed in a capsule having end plugs and a holding spring.

9 Claims, 3 Drawing Sheets

PRIMARY NEUTRON SOURCE MULTIPLIER ASSEMBLY

BACKGROUND OF THE INVENTION

1. Field of the Invention

This invention provides the means and mechanism by which to produce a steady source of high-energy neutrons which, in addition to the multiplication and efficient transformation of the radioactive energy of the primary driver isotope, can also be changed in strength through simple adjustments to the physical layout of the multiplier assembly. The resulting neutron source has many practical uses including, but not limited to: startup source for a nuclear reactor, non-destructive testing of materials, neutron activation analysis, sample moisture analysis, oil well logging, medical treatment of cancer, explosive detection, metal fatigue detection, and other real-time evaluations of chemical composition and moisture content of process streams such as combustion optimization in power plants and cement kilns.

2. Description of Related Art

Multiple neutron sources (emitters) are generally required in order to safely start up a nuclear reactor core. The reactor startup sources used for this purpose are referred to as "primary sources" and "secondary sources." Primary sources are self-contained sources of neutrons that provide neutrons without the need for external power or irradiation from the reactor itself. Secondary reactor startup sources are universally made of initially non-radioactive driver materials uniformly mixed with beryllium. The secondary source driver material (typically antimony) is non-radioactive for manufacture. As a result, the secondary source does not produce a neutron source until the driver material is irradiated in a nuclear reactor. The secondary source produces neutrons as a result of the interaction of high energy gamma radiation from the radioactive decay of the driver material with the beryllium. Typical of the current art primary source driver materials, all used in combination with beryllium, are strong alpha particle emitting isotopes of polonium, radium, plutonium, americium or curium. The only material that is a practical primary source for commercial applications without the use of admixed beryllium is californium-252 or $^{252}Cf$.

Descriptions of producing "secondary source" radio-isotopes within nuclear reactors is generally described by Ransohoff et al. and Bodnarescu (U.S. Pat. Nos. 3,269,915 and 3,396,077, respectively). A description of use of "primary sources" and the general use of neutron sources is described, in detail, by Impink, Jr. (U.S. Pat. No. 4,208,247—issued in June 1980, hereinafter "Impink"), where, preferably, plutonium-238 and beryllium are encapsulated in an alloy that does not allow transmission of thermal neutrons, that is, essentially "black" to thermal neutrons, such as pure cadmium; 65% silver/cadmium or 80% silver/15% indium/cadmium.

A reactor start-up neutron source is used to safely assist the initiation of nuclear chain reaction in the initial core loading of nuclear reactors. A reactor startup source is required for safe startup of an initial core containing only fresh unirradiated nuclear fuel because the neutron population density from all sources (e.g., spontaneous fission of the fuel, cosmic radiation, deuterium photoneutrons) is insufficient for reliable monitoring of the reactor neutron population to assure safe reactor start-up. Low neutron fluxes occur in nuclear reactors with initial cores with only mildly radioactive fuel or after prolonged shutdown periods in which the irradiated fuel has decayed thereby reducing the inherent neutron source of the reactor from the previously mentioned mechanisms. Fixed reactor primary and secondary startup neutron sources provide a population of neutrons in the reactor core that is sufficient for the plant instrumentation to reliably measure and therefore provide reactor power and reactivity information to the reactor operator to enable a safe reactor startup and also to the reactor protection system to override the operator and halt the reactor startup if an unsafe situation is detected. Without reactor startup neutron sources, the reactor could suffer a fast power excursion during start-up before the reactor protection system could intervene to terminate the startup. The start-up sources are typically inserted in regularly spaced positions inside the reactor core either in place of some of the fuel rods or within structures inside the reactor core.

In addition to the startup of nuclear reactors, neutron sources have many uses in other industrial applications. These industrial uses for neutron sources typically involve the use of the neutron source to create radioisotopes in the vicinity of the source after which the unique nuclear decay characteristics of the radioisotope(s) so created in the process being evaluated are measured and concentrations or compositions are inferred from the measurements in a process typically referred to in the art as neutron activation analysis. The resulting industrial applications include but are not limited to: non-destructive testing of materials, neutron activation analysis, sample moisture analysis, oil well logging, medical treatment of cancer, explosive detection, metal fatigue detection, and other real-time evaluations of chemical composition or moisture content in process streams such as combustion optimization in power plants and cement kilns.

Impink (cited previously) further teaches that (at the time of the patent), neutron sources for commercial reactors have been positioned within the nuclear core, and remained within the core, during at least one entire operating cycle. The sources maintained a fixed position. In reactors, sources are inserted in selected fuel assemblies and extend within fuel assembly guide thimbles designed to provide structure for the fuel assembly and provide guidance for the insertion of control elements into the reactor. The sources are also disposed in assemblies close to the core periphery so as to be positioned within the detection range of the detection and monitoring apparatus outside of the reactor vessel.

Beryllium is a light weight, strong but brittle, light grey alkaline earth metal. It is primarily used in non-nuclear applications as a hardening agent in alloys, notably beryllium copper. Structurally, beryllium's very low density (1.85 times that of water), high melting point (1287° C.), high temperature stability and low coefficient of thermal expansion, make it in many ways an ideal high-temperature material for aerospace and nuclear applications. Commercial use of beryllium metal presents technical challenges due to the toxicity (especially by inhalation) of beryllium-containing dusts. Beryllium produces a direct corrosive effect to tissue, and can cause a chronic life-threatening allergic disease called berylliosis in susceptible persons.

In the nuclear area, beryllium is an extremely unusual element in that essentially all naturally occurring beryllium is of the $^9Be$ isotope which has a very low binding energy (1.69 MeV) for its last neutron. The result of this peculiar aspect of the nuclear physics of beryllium is that, when excited by radiation more energetic than the threshold energy shown below, the $^9Be$ disintegrates as shown below by neutron emission and forms the much more stable helium or carbon atoms.

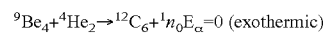

$$^9Be_4 + ^4He_2 \rightarrow ^{12}C_6 + ^1n_0 \; E_\alpha = 0 \text{ (exothermic)}$$

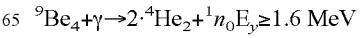

$$^9Be_4 + \gamma \rightarrow 2 \cdot ^4He_2 + ^1n_0 \; E_\gamma \geq 1.6 \text{ MeV}$$

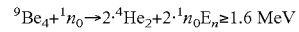

$$^9Be_4 + ^1n_0 \rightarrow 2 \cdot ^4He_2 + 2 \cdot ^1n_0 \; E_n \geq 1.6 \text{ MeV}$$

Californium (element 98) is a rare and exclusively man-made element that is synthesized by long term irradiation of other rare man-made isotopes such as plutonium or curium in specialized high flux reactors specifically designed to produce high-order actinide isotopes. Californium (Cf) is used exclusively for applications that take advantage of its strong neutron-emitting properties. The $^{252}$Cf isotope is, by far, the most widely used isotope of californium for neutron sources due to its high source strength, production yield and relatively long half life. There are currently only two facilities in the world that currently synthesize and separate $^{252}$Cf. At this time, ~90% of the world's annual production of ~200 milligrams is produced at the fifty year old High Flux Isotope Reactor at the Oak Ridge National Laboratory in Tennessee. The $^{252}$Cf produced in the reactor is initially purified at the reactor site by separating the $^{252}$Cf from all of the other actinides and fission products that result from the target irradiation in a complex radiochemical process that is performed remotely in a hot cell laboratory. The separation process is concluded by coating an inert material wire, foil or other form with the $^{252}$Cf chemical compound from the separation process and placing the resulting form in a cask that shields the resulting $^{252}$Cf source material, thereby allowing the material to be removed from the hot cell laboratory. The high neutron strength of $^{252}$Cf makes it necessary for any source manufacturing subsequent to the separation of the Cf from all of the other actinides and fission products to be done remotely in a well shielded facility to protect the manufacturing staff. As a result, it is only practical to employ simple manufacturing processes in the manufacture of neutron sources using $^{252}$Cf. Even in view of previous patents cited, there seems no logical reason to try to add anything to californium as a neutron source as it is already the strongest source of neutrons by weight of any available radioisotope.

Referring now to prior art FIG. 1, there is shown one embodiment of a typical thermal nuclear reactor including a sealed reactor vessel 10 housing a nuclear core 12 comprised of a plurality of fuel assemblies 14 (shown in FIG. 2A). A reactor coolant, such as one including water, enters the vessel through inlet nozzles 16, passes downward in an annular region between the vessel and a core support structure, turns and flows upward through a perforated plate 20 and through the core 12 and is discharged through outlet nozzles 22.

A fuel assembly 14 is shown in prior art FIG. 2A and includes a plurality of fuel pins 24, containing nuclear fuel pellets 26, arranged in a bundle. The assembly also includes a plurality of guide thimbles 28 which provide skeletal support for the assembly and which are sized to removably receive control rods 29 of control elements 30, positionable above and within the core area by means such as electromagnets 32 which act upon shafts 34 (FIG. 1) removably connected to the control elements 30.

The neutron flux within the core is continuously monitored by detection apparatus such as the neutron detectors 36 (FIG. 1) which are located at an elevation aligned with the elevation of the core 12. The detectors, located external to the vessel, may be fixed or laterally movable by positioning bars 38.

The guide thimbles 28 of the fuel assemblies 14, in addition to receiving control rods 29, shown in FIG. 2A, are sized to receive neutron sources capsules shown in FIG. 2B. The capsules contain a neutron emitting source 44.

The source 44 includes a major mass of fast neutron emitting material, encapsulated and held in place by cladding 48. The preferred source material, for current art reactor startup sources is $^{252}$Cf due to a combination of factors including source strength. Nonetheless, $^{252}$Cf source material is extremely expensive and only available in limited quantities, so minimizing the requirements of these materials is very important. The optimal solution for a primary source is one that minimizes the amount of $^{252}$Cf required to accomplish the required function. Additionally, the lifetime of a neutron source is determined by the minimum source strength that achieves the required function. Therefore, it is one of the main objects of this invention to make more efficient use of the $^{252}$Cf to either reduce the amount of $^{252}$Cf required for a source or to extend the useful lifetime of a given amount of $^{252}$Cf.

SUMMARY OF THE INVENTION

The above problems are solved and objects met by combining a $^{252}$Cf driver source and a beryllium multiplier assembly in a manner that the large majority of the radioactive decay energy from the $^{252}$Cf driver source can be transformed into neutrons by the beryllium multiplier ("multiplier assembly") and the resulting neutrons can then be multiplied by the beryllium (n,2n) reaction. The invention involves a fast neutron emitting source multiplier assembly, consisting essentially of a driver source of $^{252}$Cf deposited on a surface consisting essentially of foil and wire, and encapsulated and surrounded by a beryllium segment as a multiplier segment. The current art primary source designs utilize only the 3.1% of the decay events of $^{252}$Cf that are spontaneous fission events. The remainder of the decay events are high-energy alpha decays whose energy is completely shielded by the source cladding (48) that surrounds the $^{252}$Cf source (44) as shown in prior art FIG. 2B. The preferred embodiment of the invention driver source is a $^{252}$Cf coated wire or foil embedded in a recess within a simple machined beryllium multiplier. Preferably, the beryllium will be in two parts as shown in FIGS. 3A and 3B for ease of insertion of the driver source 68. The dimensions of the beryllium multiplier are only critical to the extent that the energy of the alpha particle and spontaneous fission products is captured within the beryllium multiplier. Due to the massive, charged nature of these particles, the amount of beryllium necessary to absorb the energy is much less than that necessary to form a structurally adequate container for the driver source assembly. The capture of the energy of the $^{252}$Cf alpha and spontaneous fission decay results in approximately nine-fold increase in neutron source strength per unit mass of $^{252}$Cf driver material relative to current art $^{252}$Cf primary sources. The strength of the invention neutron source can also be modulated by the inclusion of a shield curtain that can be imposed between the $^{252}$Cf driver source and the beryllium multiplier. This shield curtain is capable of stopping alpha particles and interferes with transmission of alpha particles to the beryllium multiplier.

Increasing the mass of the multiplier assembly will further increase the neutron source strength by increasing the beryllium (n,2n) reaction resulting from the neutron produced directly from the $^{252}$Cf by spontaneous fission as well as those produced in the beryllium as a result of interactions with the high-energy alpha particles and fission products resulting from the $^{252}$Cf decay. The preferred embodiment encapsulates the multiplier assembly within a hermetically sealed source capsule which includes a means for holding the multiplier assembly together, preferably a spring and void volume to provide space to collect the helium gas that evolves from the beryllium disintegration reaction without over pressurizing the source capsule. In the multiplier of this invention, the neutrons produced directly by the $^{252}$Cf and those produced by the transformation of alpha and fission products by the beryllium multiplier assembly are further multiplied by beryllium (n,2n) reactions before they are emitted from the source assembly.

The main innovation of this invention is the combination of $^{252}$Cf, already a strong neutron source, with the heterogeneous beryllium multiplier to complete the transformation of the $^{252}$Cf radioactive energy into neutrons. The manufacture of this invention requires that the $^{252}$Cf driver source be inserted into the multiplier assembly prior to any structural encapsulation. Further, it requires machining and fabrication of metallic beryllium or beryllium oxides. Finally, all of the manufacturing must be performed remotely in the presence of an intense neutron source.

The $^{252}$Cf and Be together provide a synergy, allowing weight reduction of $^{252}$Cf from about 260 micrograms to about 30 micrograms, per multiplier assembly, an $8^+$x reduction due to beryllium excitation neutron multiplication.

BRIEF DESCRIPTION OF THE DRAWINGS

The advantages, nature and additional features of this invention will be better understood from the following description, taken in connection with the accompanying drawings, in which.

DESCRIPTION OF THE PREFERRED EMBODIMENTS

Figure 1:
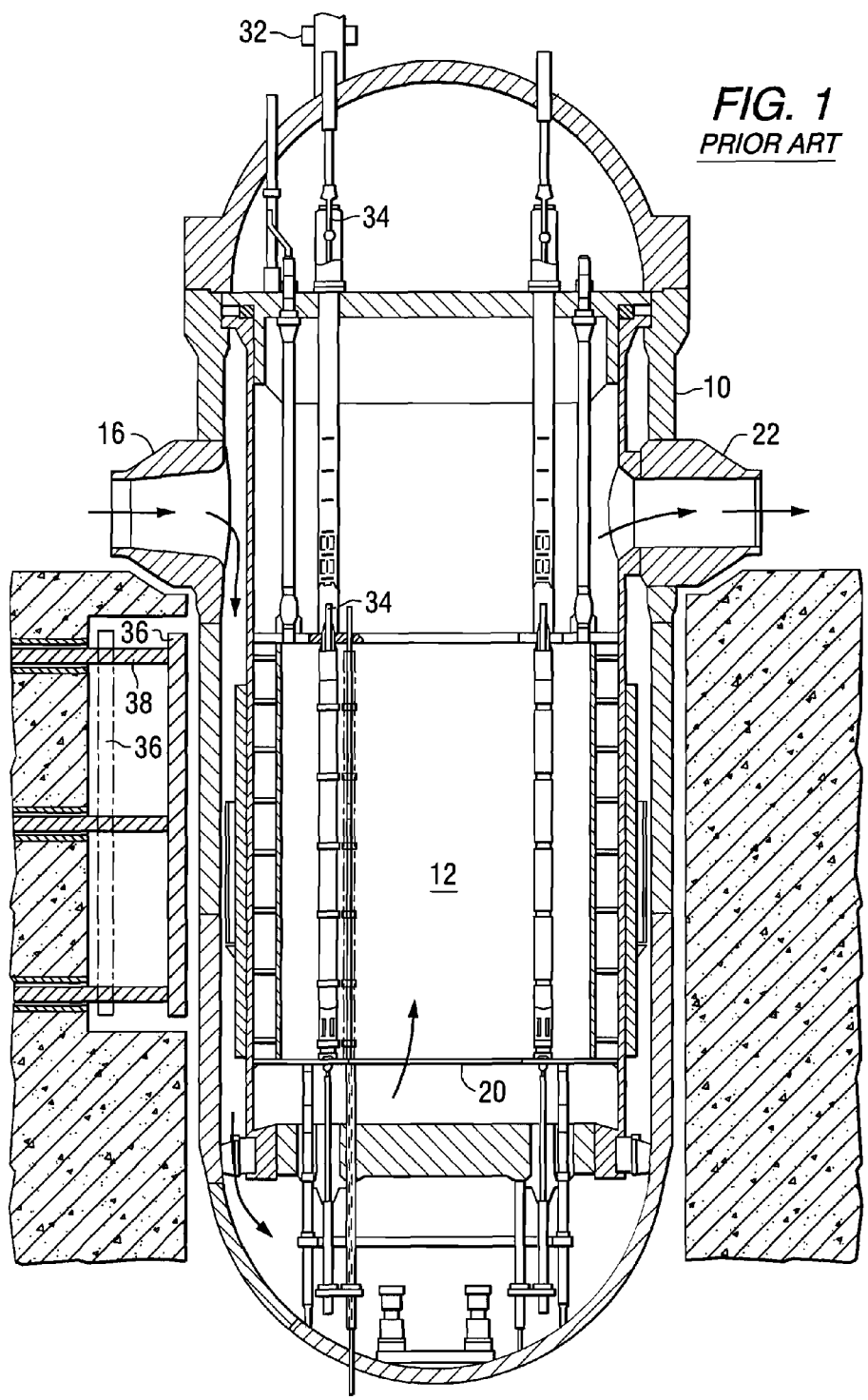
FIG. 1 is a prior art elevation view, partially in section, through the reactor vessel of one embodiment of a typical nuclear reactor.
Figure 2A:
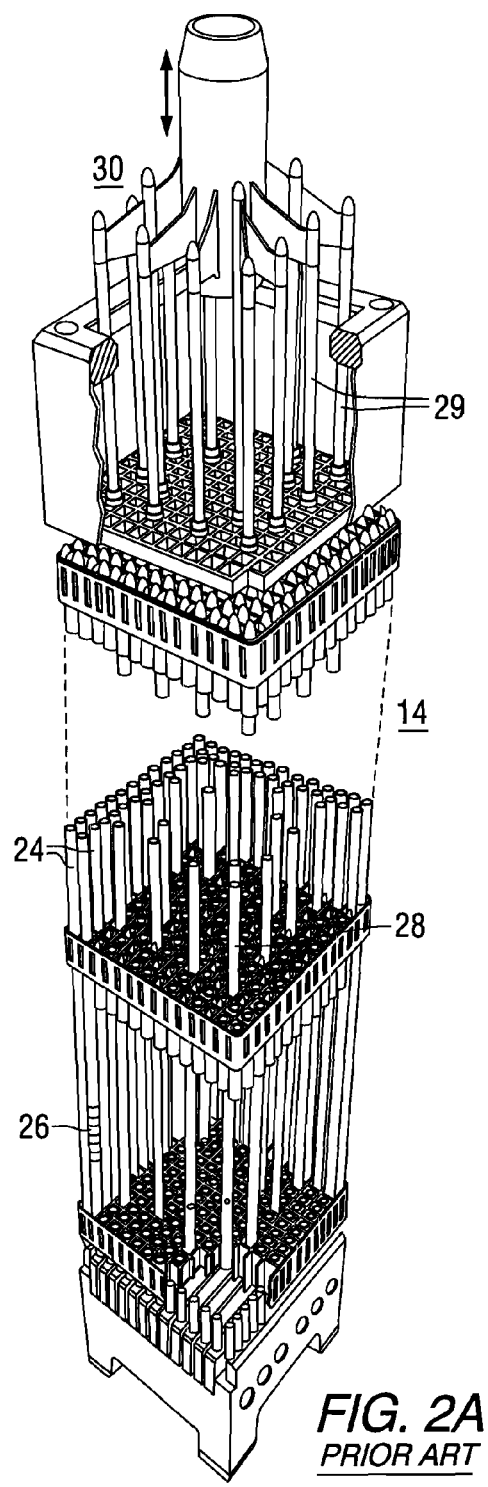
FIG. 2A is a prior art perspective view of a fuel assembly having a control element inserted therein.
Figure 2B:
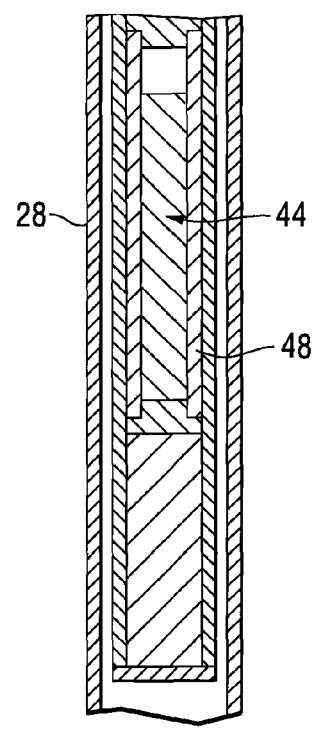
FIG. 2B is a prior art neutron source insert into a fuel assembly.
Figures 3A, 3B:
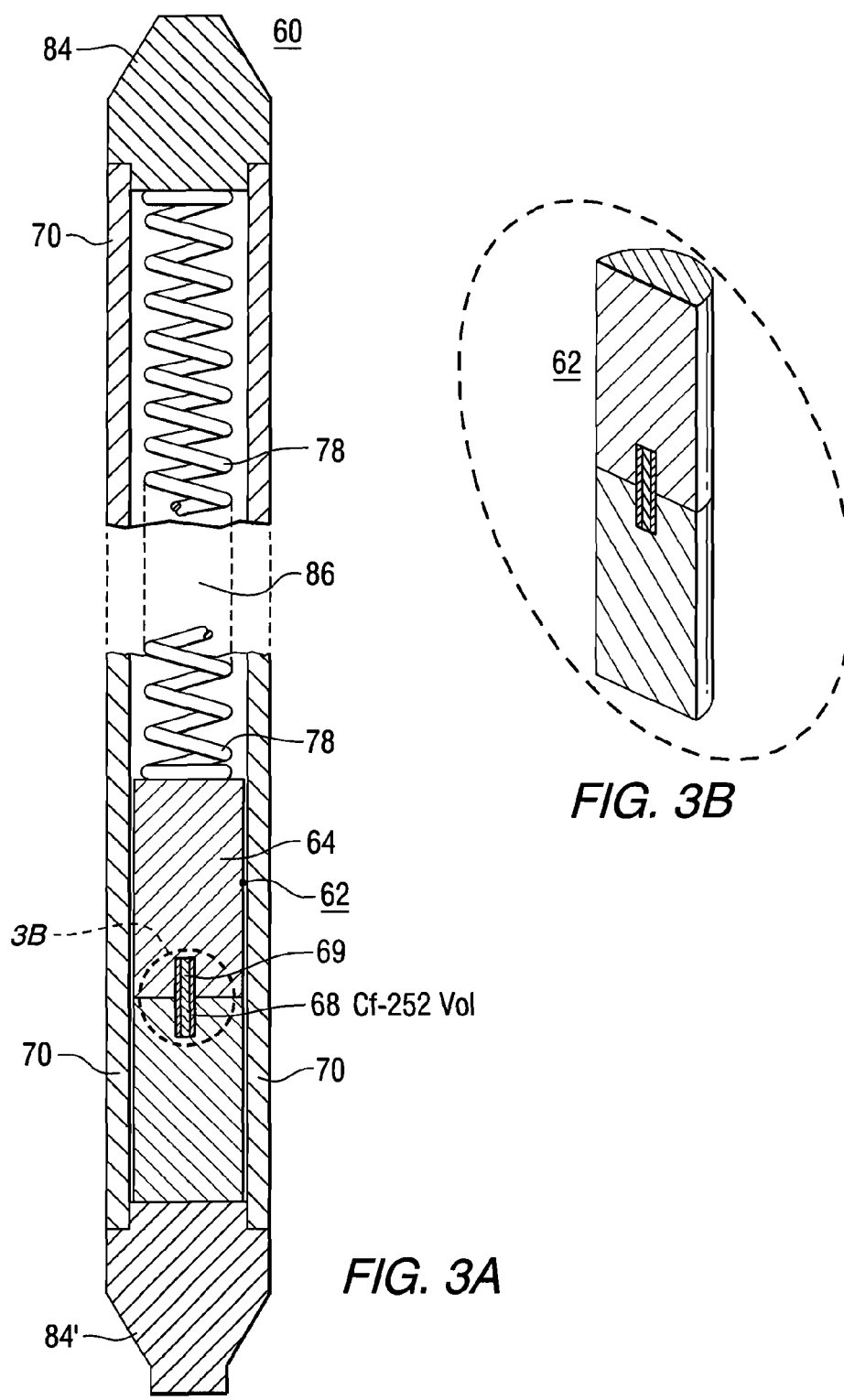
FIG. 3A is a cross-sectional view of the neutron source capsule of this invention, disposed in a reactor thimble tube.
FIG. 3B, which best illustrates the broadest embodiment of this invention as a reactor startup source, is a three-dimensional view of the neutron source showing the $^{252}$Cf, wire and beryllium components.

In this invention, a major amount of beryllium will be used to encase/surround/encapsulate a minor amount of $^{252}$Cf, as shown in FIG. 3A discussed below. Only $^{252}$Cf and Be are used in the multiplier assembly of this invention. The multiplier assembly consists of $^{252}$Cf coated onto wire or foil and Be. The preferred embodiment of the invention described herein utilizes all of the different types of radiation from the $^{252}$Cf so that they are efficiently transformed into neutrons. Even though the $^{252}$Cf is a very strong neutron source, neutrons are only directly produced as a result of the 3.1% of the decays that are spontaneous fission with an average of 3.77 neutrons emitted per fission. The current art $^{252}$Cf neutron sources render the remaining 96.9% of the $^{252}$Cf radioactive energy as alpha particles useless by dissipating the energy of this energy as heat in the standard source design stainless steel sheath.

The preferred embodiment does not use a source sheath, which is also an extremely effective shield for the alpha particle and fission product energy, but rather utilizes a bare wire, typically of palladium, onto which $^{252}$Cf has been deposited after separation from the various irradiation products from the reactor. Instead of the wire being encapsulated in a shield, it is encapsulated in a simple beryllium multiplier assembly which then is directly illuminated with the alpha particles, fission products, prompt fission gammas and high energy neutrons that result from the decay of $^{252}$Cf. As a result, the neutron source strength of the bare $^{252}$Cf coated wire is multiplied by approximately a factor of eight to ten resulting in either a significantly stronger or longer lived source for the same amount of $^{252}$Cf or a ninefold reduction in the amount of $^{252}$Cf required for a constant source strength. Calculations have shown that the typical 600 MBq reactor startup primary source with the current art unmultiplied source requires nearly 260 µg of $^{252}$Cf while the multiplied source requires only 29 µg.

Referring now to FIG. 3A, a primary source capsule 60 is shown including the driver source of $^{252}$Cf, shown as 68 coated onto a substrate wire 69, and an encasing/surrounding/encapsulating beryllium segment 64, to provide multiplier assembly 62. This multiplier assembly 62 is better illustrated in FIG. 3B. The multiplier assembly 62 can have a wide variety of uses in nuclear power plants, oil well logging and elsewhere.

Here, the multiplier assembly 62 consisting of $^{252}$Cf shown as 68, coated on a substrate/surface 69, surrounded by Be, shown as 64, can be inserted or be contained/encased by a surrounding hollow tube/rod 70. The ends of the primary source capsule can be sealed by top end plug 84 and bottom end plug 84', with a positioning element, most simply a spring 78 holding the contained/encased multiplier assembly 62 in place near or next to the bottom end plug 84'. The void volume within the primary source capsules is shown as 86, and is capable of capturing helium gas released directly by the $^{252}$Cf alpha decay as well as that generated by the beryllium decomposition reactions.

While specific embodiments of the invention have been described in detail, it will be appreciated by those skilled in the art that various modifications and alternatives to those details could be developed in light of the overall teachings of the disclosure. Accordingly, the particular embodiments disclosed are meant to be illustrative only and not limiting as to the scope of the invention which is to be given the full breadth of the appended claims and any and all equivalents thereof.

What is claimed is:

1. A fast neutron emitting source multiplier assembly, consisting essentially of:
   (1) a driver source of $^{252}$Cf;
   (2) a surface material consisting essentially of foil or wire; and
   (3) a beryllium segment as a multiplier segment;
   wherein the driver source of $^{252}$Cf is disposed on the surface material, the beryllium segment as a multiplier segment surrounds and encapsulates the driver source of $^{252}$Cf and surface material and the multiplier assembly is disposed and sealed in a hollow tube.

2. The fast neutron emitting source multiplier assembly of claim 1, wherein the beryllium segment is a machined beryllium segment having a notch formed approximately in the center of the beryllium segment into which the $^{252}$Cf is disposed.

3. The fast neutron emitting source multiplier assembly of claim 1, wherein the beryllium is sized to capture the energy of substantially all of the alpha decay particles from $^{252}$Cf which transforms the energy of these particles into neutrons.

4. The fast neutron emitting source multiplier assembly of claim 3, wherein the neutrons produced directly by the $^{252}$Cf and those produced by the transformation of alpha and fission products by the beryllium multiplier assembly are further multiplied by beryllium (n,2n) reactions before they are emitted from the source assembly.

5. The fast neutron emitting source multiplier assembly of claim 1, wherein the surface material is palladium foil or wire.

6. The fast neutron emitting source multiplier assembly of claim 1, wherein the hollow tube is sealed by top and bottom end plugs wherein the multiplier assembly is held in place against one of the end plugs by a spring.

7. The fast neutron emitting source multiplier assembly of claim 6, wherein helium gas evolving from the neutron source reaction is maintained within a void volume within the hollow tube.

8. The fast neutron emitting source multiplier assembly of claim 6, wherein the neutron emitting source is configured to provide a steady source of neutrons sufficient to safely startup a nuclear reactor.

9. The fast neutron emitting source multiplier assembly of claim 1 in which a shield curtain of material capable of stopping alpha particles is interposed between the $^{252}$Cf driver source and the beryllium segment to modulate the neutron source strength by interfering with transmission of alpha particles to the beryllium segment.

* * * * *